United States Patent
Benveniste

(10) Patent No.: US 7,983,232 B2
(45) Date of Patent: *Jul. 19, 2011

(54) WIRELESS LANS AND NEIGHBORHOOD CAPTURE

(75) Inventor: Mathilde Benveniste, South Orange, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 892 days.

This patent is subject to a terminal disclaimer.

(21) Appl. No.: 11/864,244

(22) Filed: Sep. 28, 2007

(65) Prior Publication Data

US 2008/0013522 A1    Jan. 17, 2008

Related U.S. Application Data

(63) Continuation of application No. 10/256,384, filed on Sep. 27, 2002, now Pat. No. 7,280,517.

(60) Provisional application No. 60/330,930, filed on Nov. 2, 2001, provisional application No. 60/331,030, filed on Nov. 7, 2001, provisional application No. 60/331,211, filed on Nov. 13, 2001, provisional application No. 60/342,343, filed on Dec. 21, 2001.

(51) Int. Cl.
*H04W 4/00* (2009.01)
*H04W 72/00* (2009.01)
*H04B 7/212* (2006.01)
*H04L 12/413* (2006.01)

(52) U.S. Cl. ........ 370/338; 370/346; 370/348; 370/444; 370/448; 370/449; 455/443; 455/452.1

(58) Field of Classification Search .................. 370/338, 370/346, 348, 444, 448, 449; 455/443, 452.1
See application file for complete search history.

(56) References Cited

U.S. PATENT DOCUMENTS 4,987,571 A    1/1991    Haymond et al.
(Continued)

FOREIGN PATENT DOCUMENTS

EP    0994604 A2    4/2000
(Continued)

OTHER PUBLICATIONS

"Amendment- Radio Equipment and Systems (RES); High Performance Radio Local Area Network (HIPERLAN) Type 1; Functional Specification", ETSI, ETS 300 652, May 1997, pp. 1-21.

(Continued)

*Primary Examiner* — Alpus H Hsu

(57) ABSTRACT

Overlapped wireless LAN cells in a medium have an equal chance at establishing a session on the medium. A first member station in the first cell transmits a timing packet containing a timestamp value, which is received at a second member station in the second cell. This synchronizes member stations in the first and second cells to interrupt transmissions at a global channel release instant corresponding to the timestamp value. The member stations in the first and second cells then have the opportunity to contend for access to the medium following the global channel release instant, using a slotted CSMA/CA access method. Each of the member stations in the first and second cells has a superframe clock that is synchronized based on the timestamp value, thereby establishing a periodic global channel release instant during each of a plurality of periodic superframes. The member stations can then periodically interrupt transmissions at the periodic global channel release instant to contend for the medium. The periodic global channel release instant occurs at intervals that are sufficiently close to meet delay and jitter restrictions for time-critical voice and video applications.

28 Claims, 5 Drawing Sheets

U.S. PATENT DOCUMENTS

| | | | |
|---|---|---|---|
| 5,142,533 | A | 8/1992 | Crisler et al. |
| 5,185,739 | A | 2/1993 | Spear |
| 5,329,531 | A | 7/1994 | Diepstraten et al. |
| 5,353,287 | A | 10/1994 | Kuddes et al. |
| 5,355,375 | A | 10/1994 | Christensen |
| 5,416,780 | A | 5/1995 | Patel |
| 5,471,631 | A | 11/1995 | Beardsley et al. |
| 5,636,223 | A | 6/1997 | Reardon et al. |
| 5,644,576 | A | 7/1997 | Bauchot et al. |
| 5,682,381 | A | 10/1997 | Sekihata et al. |
| 5,768,267 | A | 6/1998 | Raith et al. |
| 5,828,663 | A | 10/1998 | Ikegami |
| 5,852,405 | A | 12/1998 | Yoneda et al. |
| 5,852,723 | A | 12/1998 | Kalkunte et al. |
| 5,892,769 | A | 4/1999 | Lee |
| 5,987,033 | A | 11/1999 | Boer et al. |
| 5,999,818 | A | 12/1999 | Gilbert et al. |
| 6,011,784 | A | 1/2000 | Brown et al. |
| 6,047,175 | A | 4/2000 | Trompower |
| 6,052,594 | A | 4/2000 | Chuang et al. |
| 6,055,578 | A | 4/2000 | Williams et al. |
| 6,067,291 | A | 5/2000 | Kamerman et al. |
| 6,078,591 | A | 6/2000 | Kalkunte |
| 6,199,170 | B1 | 3/2001 | Dietrich |
| 6,246,702 | B1 | 6/2001 | Fellman et al. |
| 6,272,117 | B1 | 8/2001 | Choi et al. |
| 6,343,071 | B1 | 1/2002 | Lansford |
| 6,418,148 | B1 | 7/2002 | Kumar et al. |
| 6,434,187 | B1 | 8/2002 | Beard et al. |
| 6,473,414 | B1 | 10/2002 | Hartley et al. |
| 6,490,727 | B1 * | 12/2002 | Nazarathy et al. ............ 725/129 |
| 6,493,331 | B1 | 12/2002 | Walton et al. |
| 6,614,799 | B1 | 9/2003 | Gummalla et al. |
| 6,625,162 | B2 | 9/2003 | Myojo et al. |
| 6,661,804 | B2 | 12/2003 | Fellman et al. |
| 6,697,013 | B2 | 2/2004 | McFarland et al. |
| 6,698,022 | B1 | 2/2004 | Wu |
| 6,754,176 | B1 | 6/2004 | Gubbi et al. |
| 6,791,997 | B2 | 9/2004 | Beyer et al. |
| 6,795,418 | B2 | 9/2004 | Choi |
| 6,832,093 | B1 | 12/2004 | Ranta |
| 6,865,609 | B1 | 3/2005 | Gubbi et al. |
| 6,907,023 | B2 | 6/2005 | McKenna et al. |
| 6,963,549 | B1 | 11/2005 | Jayaraman et al. |
| 6,985,499 | B2 | 1/2006 | Elliot |
| 7,024,200 | B2 | 4/2006 | McKenna et al. |
| 7,095,754 | B2 | 8/2006 | Benveniste |
| 7,136,361 | B2 | 11/2006 | Benveniste |
| 7,180,905 | B2 | 2/2007 | Benveniste |
| 7,221,681 | B2 | 5/2007 | Choi et al. |
| 7,245,604 | B2 | 7/2007 | Benveniste |
| 7,245,605 | B2 | 7/2007 | Benveniste |
| 7,248,600 | B2 | 7/2007 | Benveniste |
| 7,251,232 | B1 | 7/2007 | Meier |
| 7,266,085 | B2 * | 9/2007 | Stine ............................ 370/252 |
| 7,277,413 | B2 | 10/2007 | Benveniste |
| 7,277,415 | B2 | 10/2007 | Benveniste |
| 7,280,517 | B2 | 10/2007 | Benveniste |
| 7,286,827 | B2 | 10/2007 | McKenna et al. |
| 7,379,432 | B2 | 5/2008 | Benveniste |
| 7,409,700 | B1 | 8/2008 | Watson |
| 7,773,625 | B2 | 8/2010 | Benveniste |
| 2002/0061031 | A1 | 5/2002 | Sugar et al. |
| 2002/0071448 | A1 | 6/2002 | Cervello |
| 2002/0152324 | A1 | 10/2002 | Sherman |
| 2002/0172186 | A1 | 11/2002 | Larsson |
| 2002/0188723 | A1 | 12/2002 | Choi et al. |
| 2003/0013451 | A1 | 1/2003 | Walton |
| 2003/0103521 | A1 | 6/2003 | Raphaeli et al. |
| 2003/0117984 | A1 | 6/2003 | Gavette |
| 2003/0123405 | A1 | 7/2003 | Del Prado et al. |
| 2003/0161340 | A1 | 8/2003 | Sherman |
| 2003/0224787 | A1 | 12/2003 | Gandolfo |
| 2004/0022219 | A1 | 2/2004 | Mangold et al. |
| 2004/0047319 | A1 | 3/2004 | Elg |
| 2006/0002357 | A1 | 1/2006 | Sherman |
| 2006/0041676 | A1 | 2/2006 | Sherman |
| 2007/0263581 | A1 | 11/2007 | Benveniste |
| 2008/0002632 | A1 | 1/2008 | Pandey et al. |
| 2008/0013508 | A1 | 1/2008 | Benveniste |
| 2008/0013509 | A1 | 1/2008 | Benveniste |
| 2008/0013515 | A1 | 1/2008 | Benveniste |
| 2008/0019329 | A1 | 1/2008 | Benveniste |
| 2008/0019343 | A1 | 1/2008 | Benveniste |
| 2008/0291873 | A1 | 11/2008 | Benveniste |

FOREIGN PATENT DOCUMENTS

| | | |
|---|---|---|
| WO | WO 03-039054 A2 | 5/2003 |
| WO | WO 03/041427 A1 | 5/2003 |

OTHER PUBLICATIONS

"Broadband Radio Access Network (BRAN); HIPERLAN type 2; System Overview", ETSI, ETSI TR 101 683 VI.1.1 (Feb. 2002), Technical Report, pp. 1-19.

"Broadband Radio Access Networks (BRAN); HIPERLAN Type 2; Data Link Control (DLC) Layer; Part 4: Extension for Home Environment" ETSI, ETSI TS 101 761-4 VI.2.1. (Dec. 2000), pp. 1-125.

Diepstraten, "Wireless Access Method and Physical Specification", IEEE, IEEE P802.11-93/70, May 1993, pp. 1-16 slides 1-6.

White, "Wireless Access Method and Physical Layer Specifications", IEEE, IEEE P802.11-93/159, Sep. 1993, pp. 1-8.

Diepstraten et al. Wireless Access Method and Physical Specification, IEEE, IEEE O802.11-94/150, Jul. 1994, pp. 1-12, Slides 1-11 & 1-23.

Andrew S. Tanenbaum, *Computer Networks*, 3ed, 1996 Prentice Hall, Chapter 4, "The Medium Access Sublayer", pp. 243-338.

James L. Massey, "Collision-Resolution Algorithms and Random-Access Communications, "Multi-User Communication Systems, edited by G. Long, Universita' di Trieste, 1981 by CISM, Udine, pp. 73-137.

Leonard Kleinrock et al., "Packet Switching in Radio Channels: Part I—Carrier Sense Multiple-Access Modes and Their Throughput-Delay Characteristics," IEEE Transactions on Communications, vol. Com-23, No. 12, Dec. 1975, pp. 1400-1416.

Ronald L. Rivest, "Network Control by Bayesian Broadcast, " IEEE Transaction on Information Theory, vol. IT-33, May 1987, pp. 323-328.

Phil Karn, "MACA-A New Channel Access Method for Packet Radio," 9th Computer Networking Conference, ARRL/CRRL Amateur Radio, 1990, pp. 134-140.

Vaduvur Bharghavan et al., "MACAU: A Media Access Protocol for Wireless LAN's", Computer Communication Review, vol. 24, No. 4, Oct. 1994, pp. 212-225.

The Bluetooth Special Interest group, Specification of Bluetooth System, Version 1.1, Feb. 22, 2001, pp. 41-47.

IEEE Std. 802.11, "Local and Metropolitan Area Networks", 1997, pg. 92.

Bononi, L., et al. "Design and Performance Evaluation of an Asymptotically Optimal Backoff Algorithm for IEEE 802.11 Wireless LANs", Proceeding of the 33rd Hawaii International Conference on System Sciences—2000, Jan. 4-7, 2000, pp. 1-10.

Deng, Dr-Jiunn, et al. "A Priority Scheme for IEEE 802.11 DCF Access Method", IEICE Trans. Communication, Jan. 1999, vol. E82-B, No. 1.

* cited by examiner

- TOP PRIORITY
- MEDIUM PRIORITY
- LOW PRIORITY
- SIFS
- SLOT TIME

WIRELESS LANS AND NEIGHBORHOOD CAPTURE

This application is a continuation of U.S. patent application Ser. No. 10/256,384, filed on Sep. 27, 2002, entitled WIRELESS LANS AND NEIGHBORHOOD CAPTURE now U.S. Pat. No. 7,280,517 issued on Oct. 9, 2007) and which claims priority from:

[1] U.S. Provisional Application Ser. No. 60/330,930, filed Nov. 2, 2001, entitled "HCF ACCESS MECHANISM: OBSS MITIGATION,"

[2] U.S. Provisional Application Ser. No. 60/331,030, filed Nov. 7, 2001, entitled "'NEIGHBORHOOD' CAPTURE IN CSMA/CA WLANS,"

[3] U.S. Provisional Application Ser. No. 60/331,211 filed Nov. 13, 2001, entitled "'SHIELD': PROTECTING HIGH PRIORITY CHANNEL ACCESS ATTEMPTS," and

[4] U.S. Provisional Application Ser. No. 60/342,343, filed Dec. 21, 2001, entitled "WIRELESS LANS AND 'NEIGHBORHOOD CAPTURE'," all of which are incorporated herein by reference.

RELATED APPLICATIONS

This patent application is related to U.S. patent application Ser. No. 09/985,257, now issued U.S. Pat. No. 7,095,754, filed Nov. 2, 2001, by Mathilde Benveniste, entitled "TIERED CONTENTION MULTIPLE ACCESS (TCMA): A METHOD FOR PRIORITY-BASED SHARED CHANNEL ACCESS," which is incorporated by reference.

This patent application is also related to U.S. patent application Ser. No. 10/187,132, now issued U.S. Pat. No. 7,277,413, filed Jun. 28, 2002, by Mathilde Benveniste, entitled "HYBRID COORDINATION FUNCTION (HCF) ACCESS THROUGH TIERED CONTENTION AND OVERLAPPED WIRELESS CELL MITIGATION," which is incorporated by reference.

This patent application is also related to U.S. patent application Ser. No. 10/256,299, now issued U.S. Pat. No. 7,248,600, filed Sep. 27, 2002, by Mathilde Benveniste, entitled "'SHIELD': PROTECTING HIGH PRIORITY CHANNEL ACCESS ATTEMPTS IN OVERLAPPED WIRELESS CELLS," which is incorporated by reference.

This patent application is also related to U.S. patent application Ser. No. 10/256,309, now issued U.S. Pat. No. 7,245,605, filed Sep. 27, 2002, by Mathilde Benveniste, entitled "PREEMPTIVE PACKET FOR MAINTAINING CONTIGUITY IN CYCLIC PRIORITIZED MULTIPLE ACCESS (CPMA) CONTENTION-FREE SESSIONS," which is incorporated by reference.

This patent application is also related to U.S. patent application Ser. No. 10/256,305, now issued U.S. Pat. No. 7,245,604, filed Sep. 27, 2002, by Mathilde Benveniste, entitled "FIXED DETERMINISTIC POST-BACKOFF FOR CYCLIC PRIORITIZED MULTIPLE ACCESS (CPMA) CONTENTION-FREE SESSIONS," which is incorporated by reference.

This patent application is also related to U.S. patent application Ser. No. 10/256,516, now issued U.S. Pat. No. 7,180,905, filed Sep. 27, 2002, by Mathilde Benveniste, entitled "ACCESS METHOD FOR PERIODIC CONTENTION-FREE SESSIONS," which is incorporated by reference.

This patent application is also related to U.S. patent application Ser. No. 10/256,471, now issued U.S. Pat. No. 7,277,415, filed Sep. 27, 2002, by Mathilde Benveniste, entitled "STAGGERED STARTUP FOR CYCLIC PRIORITIZED MULTIPLE ACCESS (CPMA) CONTENTION-FREE SESSIONS," which is incorporated by reference.

FIELD OF THE INVENTION

The invention generally relates to the field of communications and specifically to a system and method for reducing the effects of channel capture for extended periods of time in multiple-cell wireless local area networks (WLANs), thus, improving quality of service (QoS).

BACKGROUND OF THE INVENTION

A single-cell wireless LAN using the IEEE 802.11 Wireless LAN Standard is a Basic Service Set (BSS) network. When all of the stations in the BSS are mobile stations and there is no connection to a wired network, it is an independent BSS (IBSS). An IBSS has an optional backbone network and consists of at least two wireless stations. A multiple-cell wireless LAN using the IEEE 802.11 Wireless LAN Standard is an Extended Service Set (ESS) network. An ESS satisfies the needs of large coverage networks of arbitrary size and complexity.

The IEEE 802.11 Wireless LAN Standard is published in three parts as IEEE 802.11-1999, IEEE 802.11a-1999, and IEEE 802.11b-1999, which are available from the IEEE, Inc. web site http://grouper.ieee.org/groups/802/11. The IEEE 802.11 Wireless LAN Standard defines at least two different physical (PHY) specifications and one common medium access control (MAC) specification. The IEEE 802.11(a) Standard is designed to operate in unlicensed portions of the radio spectrum, usually either in the 2.4 GHz Industrial, Scientific, and Medical (ISM) band or the 5 GHz Unlicensed-National Information Infrastructure (U-NII) band. It uses orthogonal frequency division multiplexing (OFDM) to deliver up to 54 Mbps data rates. The IEEE 802.11(b) Standard is designed for the 2.4 GHz ISM band and uses direct sequence spread spectrum (DSSS) to deliver up to 11 Mbps data rates.

Other wireless LAN standards include: Open Air (which was the first wireless LAN standard), HomeRF (designed specifically for the home networking market), and HiperLAN/2 (the European counterpart to the "American" 802.11a standard). Bluetooth is a personal area network (PAN) standard. It is aimed at the market of low-power, short-range, wireless connections used for remote control, cordless voice telephone communications, and close-proximity synchronization communications for wireless PDAs/hand-held PCs and mobile phones.

The IEEE 802.11 Wireless LAN Standard describes two major components, the mobile station and the fixed access point (AP). IEEE 802.11 networks can also have an independent configuration where the mobile stations communicate directly with one another, without support from a fixed access point. The medium access control (MAC) protocol regulates access to the RF physical link. The MAC provides a basic access mechanism with clear channel assessment, channel synchronization, and collision avoidance using the Carrier Sense Multiple Access with Collision Avoidance (CSMA/CA) access method. The MAC provides link setup, data fragmentation, authentication, encryption, and power management.

Synchronization is the process of the stations in an IEEE 802.11 wireless LAN cell getting in step with each other, so that reliable communication is possible. The MAC provides the synchronization mechanism to allow support of physical layers that make use of frequency hopping or other time-based mechanisms where the parameters of the physical layer change with time. The process involves sending a beacon packet to announce the presence of a wireless LAN cell and inquiring to find a wireless LAN cell. Once a wireless LAN cell is found, a station joins the wireless LAN cell. This process is entirely distributed in wireless LAN cells and relies on a common timebase provided by a timer synchronization function (TSF). The TSF maintains a 64-bit timer running at 1 MHz and updated by information from other stations. When a station begins operation, it resets the timer to zero. The timer may be updated by information received in a beacon packet.

In an independent BSS (IBSS) wireless LAN cell, there is no access point (AP) to act as the central time source for the wireless LAN cell. In a wireless LAN cell, the timer synchronization mechanism is completely distributed among the mobile stations of the wireless LAN cell. Since there is no AP, the mobile station that starts the wireless LAN cell will begin by resetting its TSF timer to zero and transmitting a beacon packet, choosing a beacon period. This establishes the basic beaconing process for this wireless LAN cell. After the wireless LAN cell has been established, each station in the wireless LAN cell will attempt to send a beacon after the target beacon transmission time (TBTT) arrives. To minimize actual collisions of the transmitted beacon frames on the medium, each station in the wireless LAN cell will choose a random delay value, which it will allow to expire before it attempts its beacon transmission.

In order for a mobile station to communicate with other mobile stations in a wireless LAN cell, it must first find the stations. The process of finding another station is by inquiry. The inquiring may be either passive or active Passive inquiry involves only listening for IEEE 802.11 traffic. Active inquiry requires the inquiring station to transmit and invoke responses from IEEE 802.11 stations.

Active inquiry allows an IEEE 802.11 mobile station to find a wireless LAN cell while minimizing the time spent inquiring. The station does this by actively transmitting queries that invoke responses from stations in a wireless LAN cell. In an active inquiry, the mobile station will move to a channel and transmit a probe request frame. If there is a wireless LAN cell on the channel that matches the service set identity (SSID) in the probe request frame, the responding station in that wireless LAN cell will respond by sending a probe response frame to the inquiring station. This probe response includes the information necessary for the inquiring station to extract a description of the wireless LAN cell. The inquiring station will also process any other received probe response and beacon frames. Once the inquiring station has processed any responses, or has decided there will be no responses, it may change to another channel and repeat the process. At the conclusion of the inquiry, the station has accumulated information about the wireless LAN cells in its vicinity.

Joining a wireless LAN cell requires that all of the mobile station's MAC and physical parameters be synchronized with the desired wireless LAN cell. To do this, the station must update its timer with the value of the timer from the wireless LAN cell description, modified by adding the time elapsed since the description was acquired. This will synchronize the timer to the wireless LAN cell. Once this process is complete, the mobile station has joined the wireless LAN cell and is ready to begin communicating with the stations in the wireless LAN cell.

Each wireless station and access point in an IEEE 802.11 wireless LAN implements the MAC layer service, which provides the capability for wireless stations to exchange MAC frames. The MAC frame is a packet that transmits management, control, or data between wireless stations and access points. After a station forms the applicable MAC frame, the frame's bits are passed to the Physical Layer for transmission.

Before transmitting a frame, the MAC layer must first gain access to the network. Three interframe space (IFS) intervals defer an IEEE 802.11 station's access to the medium and provide various levels of priority Each interval defines the duration between the end of the last symbol of the previous frame to the beginning of the first symbol of the next frame. The Short Interframe Space (SIFS) provides the highest priority level by allowing some frames to access the medium before others, such as an Acknowledgement (ACK) frame, a Clear-to-Send (CTS) frame, or a subsequent fragment burst of a previous data frame. These frames require expedited access to the network to minimize frame retransmissions.

The Priority Interframe Space (PIFS) is used for high priority access to the medium during the contention-free period. A point coordinator in the access point connected to the backbone network controls the priority-based Point Coordination Function (PCF) to dictate which stations in a cell can gain access to the medium. The point coordinator in the access point sends a contention-free poll frame to a station, granting the station permission to transmit a single frame to any destination. All other stations in the cell can only transmit during a contention-free period if the point coordinator grants them access to the medium. The end of the contention-free period is signaled by the contention-free end frame sent by the point coordinator, which occurs when time expires or when the point coordinator has no further frames to transmit and no stations to poll.

The distributed coordination function (DCF) Interframe Space (DIFS) is used for transmitting low priority data frames during the contention-based period. The DIFS spacing delays the transmission of lower priority frames to occur later than the priority-based transmission frames. An Extended Interframe Space (EIFS) goes beyond the time of a DIFS interval as a waiting period when a bad reception occurs. The EIFS interval provides enough time for the receiving station to send an acknowledgment (ACK) frame.

During the contention-based period, the distributed coordination function (DCF) uses the Carrier-Sense Multiple Access With Collision Avoidance (CSMA/CA) contention-based protocol, which is similar to IEEE 802.3 Ethernet. The CSMA/CA protocol minimizes the chance of collisions between stations sharing the medium by waiting a random backoff interval if the station's sensing mechanism indicates a busy medium. The period of time immediately following traffic on the medium is when the highest probability of collisions occurs, especially where there is high utilization. Once the medium is idle, CSMA/CA protocol causes each station to delay its transmission by a random backoff time, thereby minimizing the chance it will collide with those from other stations.

In the IEEE 802.11 Standard, the channel is shared by a centralized access protocol, the Point Coordination Function (PCF), which provides contention-free transfer based on a polling scheme controlled by the access point (AP) of a basic service set (BSS). The centralized access protocol gains control of the channel and maintains control for the entire contention-free period by waiting the shorter Priority Interframe Space (PIFS) interval between transmissions than the stations using the Distributed Coordination Function (DCF) access procedure. Following the end of the contention-free period, the DCF access procedure begins, with each station contending for access using the CSMA/CA method.

The 802.11 MAC Layer provides both contention and contention-free access to the shared wireless medium. The MAC Layer uses various MAC frame types to implement its functions of MAC management, control, and data transmission. Each station and access point on an 802.11 wireless LAN implements the MAC Layer service, which enables stations to exchange packets. The results of sensing the channel to determine whether the medium is busy or idle are sent to the MAC coordination function of the station. The MAC coordination also carries out a virtual carrier sense protocol based on reservation information found in the Duration Field of all frames. This information announces to all other stations the sending station's impending use of the medium. The MAC coordination monitors the Duration Field in all MAC frames and places this information in the station's Network Allocation Vector (NAV) if the value is greater than the current NAV value. The NAV operates similarly to a timer, starting with a value equal to the Duration Field of the last frame transmission sensed on the medium and counting down to zero. After the NAV reaches zero, the station can transmit if its physical sensing of the channel indicates a clear channel.

At the beginning of a contention-free period, the access point senses the medium; and if it is idle, it sends a beacon packet to all stations. The beacon packet contains the length of the contention-free interval. The MAC coordination in each member station places the length of the contention-free interval in the station's Network Allocation Vector (NAV), which prevents the station from taking control of the medium until the end of the contention-free period. During the contention-free period, the access point can send a polling message to a member station, enabling it to send a data packet to any other station in the BSS wireless cell.

Quality of service (QoS) is a measure of service quality provided to a customer. The primary measures of QoS are message loss, message delay, and network availability. Voice and video applications have the most rigorous delay and loss requirements. Interactive data applications such as Web browsing have less restrained delay and loss requirements, but they are sensitive to errors. Non-real-time applications such as file transfer, email, and data backup operate acceptably across a wide range of loss rates and delay. Some applications require a minimum amount of capacity to operate at all—for example, voice and video. Many network providers guarantee specific QoS and capacity levels through the use of Service-Level Agreements (SLAs). An SLA is a contract between an enterprise user and a network provider that specifies the capacity to be provided between points in the network that must be delivered with a specified QoS. If the network provider fails to meet the terms of the SLA, then the user may be entitled a refund. The SLA is typically offered by network providers for private line, frame relay, ATM, or Internet networks employed by enterprises.

The transmission of time-sensitive and data application traffic over a packet network imposes requirements on the delay or delay jitter, and the error rates realized; these parameters are referred to generically as the QoS (Quality of Service) parameters. Prioritized packet scheduling, preferential packet dropping, and bandwidth allocation are among the techniques available at the various nodes of the network, including access points, that enable packets from different applications to be treated differently, helping achieve the different quality of service objectives. The above-cited, U.S. Pat. No. 7,095,754, entitled "Tiered Contention Multiple Access (TCMA): A Method for Priority-Based Shared Channel Access," describes the Tiered Contention Multiple Access (TCMA) distributed medium access protocol that schedules transmission of different types of traffic based on their QoS service quality specifications.

For multiple-cell wireless LANs, the limited availability of channels implies that the channels must be re-used, much like in cellular communication networks. But unlike in cellular networks, the number of channels available in wireless LANs is not adequate to ensure both contiguous coverage (which is essential for roaming) and interference-free connections at the same time. As a result, cells assigned the same channel may experience co-channel interference in the area of overlapping coverage or near a cell's periphery. The problem of overlapping cell coverage is acute when wireless LANs are installed without any awareness of what other wireless LANs are operating nearby. Consequently, multiple-cell wireless LANs must rely on a medium access control (MAC) protocol to allocate channel time among stations in order to avoid co-channel interference between cells, just as it avoids contention among stations within the same cell.

Special MAC protocols are provided for wireless LANs because transmission is flawed by higher bit error rates, different losses are experienced on a wireless channel depending on the path on which the signal travels, and a radio node cannot listen while transmitting. Additive noise, path loss and multipath result in more retransmissions and necessitate acknowledgements, as successful transmission cannot be taken for granted. The different losses experienced along different paths cause different nodes to receive transmissions at different strengths, giving rise to the phenomenon of hidden terminals, as is known in the art. These are terminals that cannot hear or be heard by a source but are capable of causing interference to the destination of a transmission. The message exchange mechanism known in the art as Request-to-Send/Clear-to-Send (RTS/CTS) alleviates the hidden terminal problem. RTS/CTS also provides a reservation mechanism that can save bandwidth in wireless LANs. The inability to detect a collision as quickly as it can be detected on cable with carrier-sense multiple access with collision detection (CSMA/CD) causes more channel time to be wasted in a collision while waiting for the entire frame to transmit before the collision is detected. Hence, carrier sensing is combined with the RTS/CTS mechanism to give carrier-sense multiple access with collision avoidance (CSMA/CA).

All channel reservations, generated either with an RTS/CTS exchange or for a contention-free period (CFP), are made with the aid of the Network Allocation Vector (NAV), which is a timer maintained by all stations. The NAV is set at the value of the duration field broadcast when the reservation is announced, either by the RTS or CTS frames, or with the PCF beacon transmitted by the AP to initiate the CFP. All stations in a cell defer access until the NAV expires. The NAV thus provides a virtual carrier-sense mechanism.

Receiving signals at different strengths, depending on their origin, gives rise to capture effects. A known capture effect, the "near-far capture," results from stronger signals being received successfully while other stations transmit at the same time. Near-far capture leads to inequities, as throughput is greater for nearby stations while distant stations are starved. In infrastructure wireless LANs, where all communications occur through the AP, the inequity can be remedied by applying power control at the station (i.e., on the uplink). By equalizing the signal strength received at the AP, all transmissions have equal probabilities of success.

A special IEEE 802.11 study group is working on enhancements to the MAC protocols that achieve acceptable QoS for Wireless LANs. Proposals for a QoS enhanced DCF (EDCF) mechanism and a QoS enhanced PCF (EPCF) mechanism are under review.

The proposed EDCF mechanism employs the Tiered Contention Multiple Access (TCMA) protocol. The basic access rules of TCMA are similar to CSMA with the following differences: transmission deferral and backoff countdown depend on the priority classification of the data. A station still waits for an idle time interval before attempting transmission following a busy period, but the length of this interval is no longer equal to DIFS. The length of an idle time interval is equal to the Arbitration-Time Inter-Frame Space (AIFS), which varies with the priority of the data. A shorter AIFS is associated with higher priority data. As a consequence, higher priority data gets to the channel faster. In addition, countdown of the backoff timer does not commence when a busy period completes unless the channel has been idle for a period equal to AIFS. This causes backoff countdown of lower priority frames to slow down and even freeze if there are higher-priority frames ready to transmit, a common occurrence in congestion.

The proposed EPCF maintains multiple traffic queues at the stations for different traffic categories. Higher-priority frames are scheduled for transmission first. Delays are reduced through improved polling-list management. Only active stations are kept on the polling list. A station with data to transmit must reserve a spot on that list, where it stays as long as it is active and for a limited number of inactive polling cycles. In the proposed draft standard, the reservation occurs inside the CFP, using a multi-channel ALOHA channel access mechanism to forward reservation requests. A priority mask is available to restrict contention by priority in case of congestion. Several of the features in EPCF are part of the MediaPlex protocol.

The hybrid coordination function (HCF) has been proposed to provide a generalization of PCF. It allows for contention-free transfers to occur as needed; not necessarily at pre-determined regular repeat times as provided by the PCF. The AP can thus send (and possibly receive) data to stations in its BSS on a contention-free basis. This contention-free session, referred to as a contention-free burst (CFB), helps an AP transmit its traffic, which is typically heavier in infrastructure cells (since stations must communicate exclusively through the AP). As in the case of the PCF, the HCF permits access to the channel by the AP after waiting for an idle period of length equal to PIFS.

Attention has also been given by the study group to the problem of co-channel overlapping BSSs (OBSSs). Channel re-use in multiple-cell Wireless LANs poses a problem for the PCF and HCF, as contention-free sessions (CFSs) are generated without coordination among co-channel APs to help prevent time overlap. Some mechanism is needed in situations where cells are within interference range of each other. The existing standard does not provide adequate coordination for contention-free sessions in such situations. The DCF mechanism does not require special measures, as stations operating under the DCF mechanism deal with interference from stations in other cells in exactly the same manner as they deal with interference from stations in their own cell.

All stations within the cell operate on one duplex TDD channel, with only one station in each cell transmitting data at any given time. In order to preserve power, stations go into a sleeping mode, which prevents frequent changes of the operating channel. Channel assignments should thus be fixed or static. Static assignments permit slow adaptation to traffic pattern changes over the course of a day. Ideally, these fixed or static assignments must be made optimal through the use of fixed or adaptive non-regular channel assignment methods, which are based on measurement-derived re-use criteria known in the art. With such an approach, statistical interference relationships between cells are established from measurements of the signal strength between stations and APs in different cells. Optimization methods use these relationships to assign the available channels to cells. Ad hoc channel assignment methods, like Dynamic Frequency Selection of HiperLAN2, can be used but with less promising results, as the re-use distances between co-channel cells are not selected optimally.

The limited number of channels available in the unlicensed band (three channels for IEEE 802.11b) will lead to a high degree of overlap in the coverage areas of co-channel cells. This overlap is exacerbated by the ad hoc placement of wireless LANs that results in overlapping BSAs. The channel time (or bandwidth) must thus be allocated among multiple co-channel cells in order to avoid interference. To be efficient, the channel should not remain idle if there is data waiting for transmission. Thus, while channel selection must be fixed or static, bandwidth allocation should be dynamic (possibly changing on a per-transmission basis).

A distributed dynamic bandwidth allocation mechanism is simply a distributed contention-based MAC protocol, which must enable sharing of the channel among APs and DCF stations in co-channel cells, as HCF and DCF co-exist. With APs accessing the channel to initiate contention-free sessions (CFPs or CFBs) before DCF stations, a prioritized distributed MAC protocol is needed. Such a protocol would also handle different priority DCF data.

The priority-based distributed MAC protocol for EDCF, TCMA, can be used to allocate the channel time among co-channel cells in a multiple-cell wireless LAN. The APs would be treated as a class with priority above the highest DCF priority class and would be assigned, therefore, a shorter AIFS than the highest-priority EDCF data. Other variations of CSMA are also appropriate.

In general, a carrier-sense-based MAC protocol would help avoid interference between cells as it causes conflicting transmissions—either DCF transmissions or CFSs—to occur at statistically (or deterministically, depending on the protocol) different times in co-channel cells.

The objective of dynamic bandwidth allocation is to promote fair access to the channel for all co-channel cells. That is, the success rate of a cell in accessing its assigned channel, either by its AP generating CFSs or by (E)DCF transmissions, should be independent of its location, assuming comparable traffic loads. Without fair access, transmissions can be delayed excessively in the disadvantaged cell, thus failing to meet QoS requirements. This goal is not realized with a traditional CSMA-type of protocol, however, when channel re-use is allowed because of a neighborhood capture effect.

Neighborhood capture arises when Ethernet-type protocols are employed in multiple-cell wireless LANs that re-use radio frequency (RF) channels. Given the small number of channels available, co-channel cells cannot all transmit simultaneously without causing interference on one another. A carrier-sense contention-based MAC protocol can allocate channel bandwidth among co-channel cells dynamically and in a distributed manner; but if used in the conventional way, it may lead to channel capture. Mutually non-interfering co-channel neighbors could deprive other co-channel neighbors of access. In general, there will be instability, with the channel retained by a group of cells for long time intervals. This would have negative impact on quality of service (QoS).

Neighborhood capture arises in a multiple-cell wireless LAN with fewer channels available than the number of cells.

Unlike in cellular communications networks, where sufficient channels are available to ensure interference-free transmission on an assigned channel, channel selection in WLAN networks must be accompanied by dynamic bandwidth allocation in order to avoid interference between co-channel cells.

Carrier-sense multiple access (CSMA)-type media access control (MAC) protocols provide dynamic bandwidth allocation in a distributed manner, obviating the need for a central controller. With such protocols, time-overlapped transmissions by stations in non-interfering co-channel cells cooperate to capture the channel for long time periods. The resulting neighborhood capture is deleterious to QoS because of the ensuing access delays in other co-channel cells.

The present invention addresses neighborhood capture and establishes a method to prevent its occurrence.

SUMMARY OF THE INVENTION

The neighborhood capture problem described above is mitigated by requiring that the channel be released by all stations at prespecified times, ideally regularly spaced. All co-channel cells are thus given an equal opportunity to contend for the channel. Slotted CSMA does not eliminate all inequities; it simply eliminates unfairness due to the synergy of the cells in a re-use group in capturing the channel, at the expense of co-channel cells outside that group. Traffic loads must be equally distributed across both cells and re-use groups for all stations to have the same success rate in seizing the channel. Additionally a variety of schronization schemes can be employed to correct time offsets.

One aspect of the invention is a method to enable overlapping first and second wireless LAN cells in a medium to have an equal chance at establishing a session on the medium. Each cell includes a respective plurality of member stations. A first member station in the first cell transmits a timing packet containing a timestamp value, which is received at a second member station in the second cell. The timing packet can be the beacon frame packet or the probe response frame packet of the IEEE 802.11 standard, in which the packet carries a superframe timestamp field. This synchronizes member stations in the first and second cells to interrupt transmissions at a global channel release instant corresponding to the timestamp value. The member stations in the first and second cells then have the opportunity to contend for access to the medium following the global channel release instant. Each of the member stations in the first and second cells has a superframe clock that is synchronized based on the timestamp value. This enables establishing a periodic global channel release instant at the member stations during each of a plurality of periodic superframes based on the clock. The member stations can then periodically interrupt transmissions at the periodic global channel release instant to contend for the medium. The periodic global channel release instant occurs at intervals that are sufficiently close to meet delay and jitter restrictions for time-critical voice and video applications. The contention for access to the medium is by a slotted CSMA/CA access method that takes place following the periodic global channel release instant.

The resulting invention provides a dynamic bandwidth allocation scheme to promote fair access to the channel for all co-channel cells. It enables the success rate of a cell in accessing its assigned channel to be independent of its location, assuming comparable traffic loads. The invention provides a dynamic bandwidth allocation scheme that meets QoS requirements.

BRIEF DESCRIPTION OF THE DRAWINGS

The invention is best described with reference to the detailed description and the following figures.

DETAILED DESCRIPTION OF-THE PREFERRED EMBODIMENTS

Figure 1A:
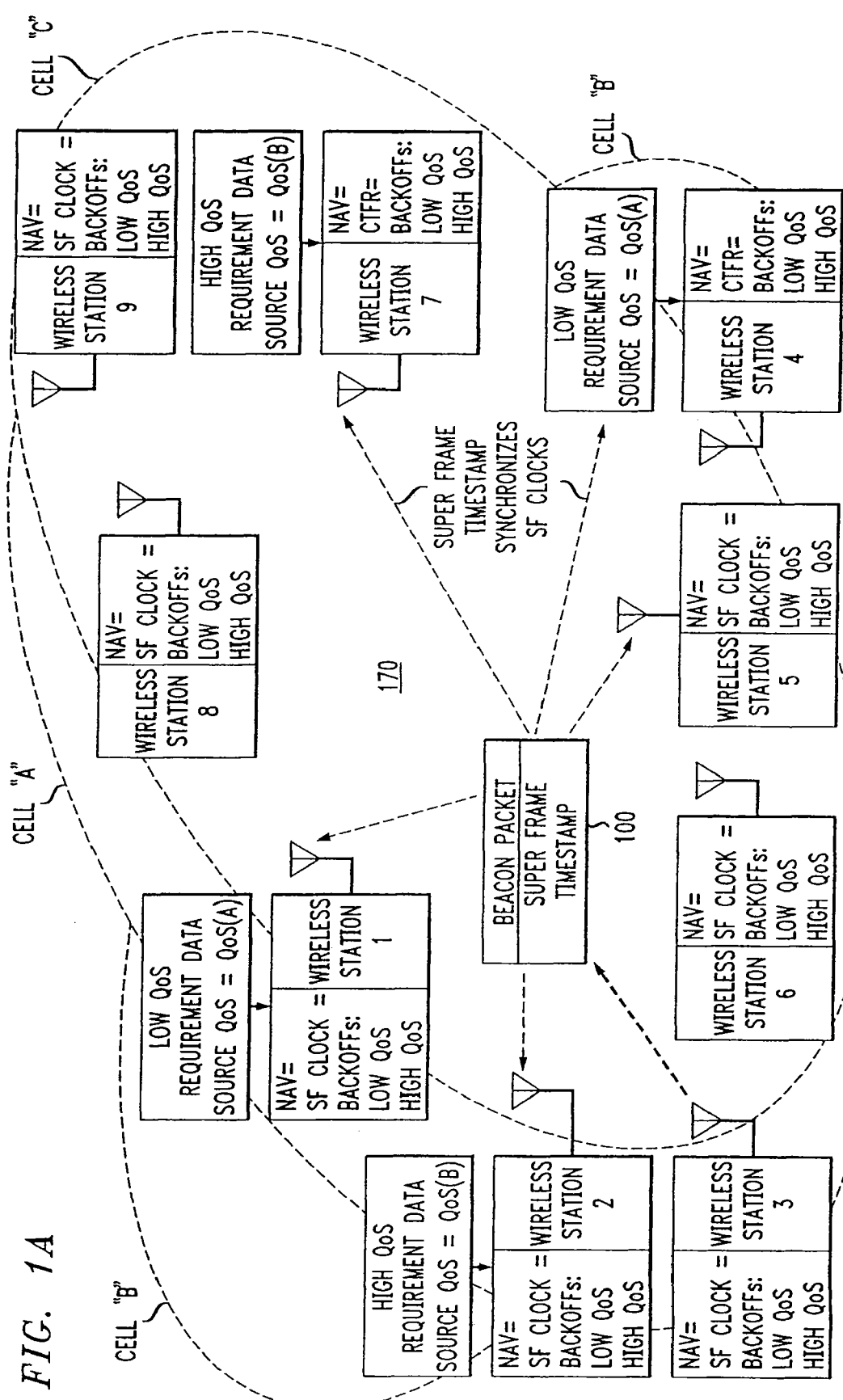
FIG. 1A shows the three-cell co-channel group of FIG. 1, in which station 3 transmits a beacon packet with a superframe timestamp that synchronizes the SF clock in each station, thereby enabling global channel release (GCR) by all stations.

The neighborhood capture effect can be understood by considering a multiple-cell WLAN where three cells have been assigned the same channel. The cells assigned to the same channel are referred to as a co-channel group. As illustrated in FIG. 1, the three cells A, B, and C comprise nine stations. Cells are depicted as dotted circles. The stations are labeled numerically and the cells are labeled with alphabetic characters. Stations 1, 2, and 3 make up cell A with station 3 serving as the AP for cell A. Stations 4, 5, and 6 make up cell B with station 4 as cell B's AP. Stations 7, 8, and 9 make up cell C with station 9 as the AP for cell C. Cells A and C are not within interference range of each other, so they are called a re-use group. Stations in the pair of cells A-B or B-C are, however, within possible interference range of one another. In the A-B cell pair, station 2 of cell A and station 5 of cell B are both in the possible interference range of one another. Correspondingly, in the B-C cell pair, station 6 of cell B and station 7 of cell C are both in the possible interference range of one another.

All stations use a CSMA-type of protocol to access the channel, which involves some form of carrier-sensing (either actual or virtual). A station will refrain from transmitting while the channel is busy, and transmission will be deferred until the backoff timer expires. Backoff countdown occurs while the channel is sensed idle and an idle time interval equal to the AIFS for the priority of the pending transmission has elapsed following a busy period.

Figure 2:
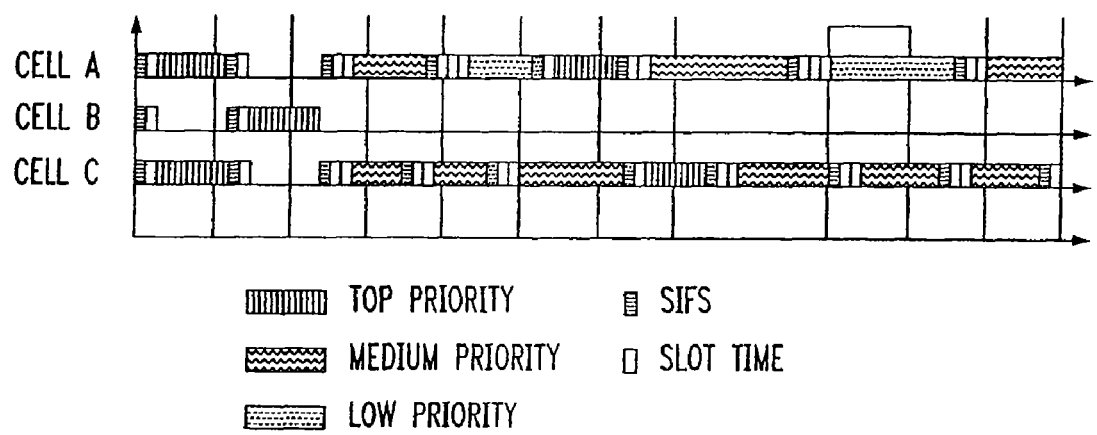
FIG. 2 depicts capture by re-use group A-C.

Because different cells hear different transmissions, depending on their location relative to other co-channel cells, their backoff countdown rates are different. As a consequence, cell B will have difficulty accessing the channel. In FIG. 2, the periods during which the channel is busy as a result of transmissions generated in each cell are shown separately.

Busy periods are separated by the Short Inter-Frame Spaces (SIFS) and idle time slots needed for AIFS and backoff delay. (AIFS equals a SIFS plus a variable number of time slots.) A station in cell A may transmit at the same time as stations in cell C. Stations in cell A must refrain from transmitting only when stations in cell B are transmitting. Stations in cell B are preempted from accessing the channel by transmissions in either of its interfering neighbors, cells A or C.

Because transmissions have variable lengths, it is very likely under loaded traffic conditions for a station in cell A to start a transmission before a transmission in cell C expires, and vice versa. As a result, cells A and C will capture the channel, not allowing a chance for stations in cell B to transmit. In general, one would expect that periphery cells, or cells at the top or bottom floors of a multiple-story building equipped with a multiple-cell WLAN, to be likely to capture the channel, at the expense of cells in the same co-channel group located in the interior. In this instance, a cell is disadvantaged not only because its competition for the channel—namely, the re-use group comprising cells A and C—has a greater combined offered load, but also because selected station members of a re-use group may transmit simultaneously, thus prolonging their retention of the channel. As can be seen from FIG. 2, the only traffic from cell B to be transmitted was high-priority. All other traffic from cell B was blocked by traffic from cells A and C even though the traffic from cells A and C was medium- and even low-priority.

Figure 3:
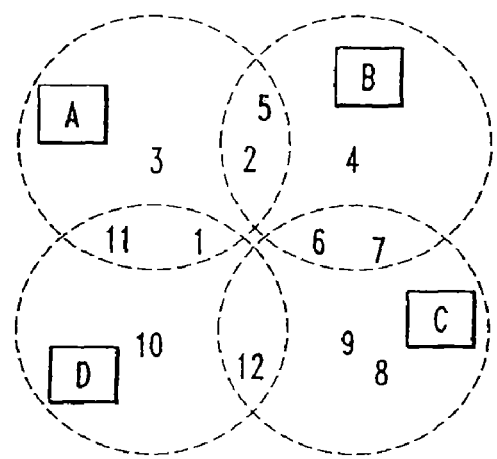
FIG. 3 illustrates a four-cell co-channel group.

Even when all cells have the same degree of competition from neighbors in the same co-channel group, there is still a problem. Consider the situation in FIG. 3 illustrating four cells, each cell having two competing co-channel neighbors. Once again the cells are labeled with alphabetic characters, the stations are labeled numerically and the cells are depicted by dotted circles. Two re-use groups exist in this co-channel group of cells: one comprising cells A and C, and another comprising cells B and D. As before, under loaded traffic conditions, a station in cell A may start a transmission before completion of a transmission in cell C, thus failing to release the channel for access by cells B and D. The same is true for stations in cells B and D. If a station in either cell seizes the channel, it will not be released until there is no pending traffic in the other cell. Assuming the offered loads in the two groups of non-interfering cells are the same, they have equal probability of capturing the channel; hence, there is no a priori unfairness in this instance. Once the channel is accessed by one re-use group, however, it will be captured and the other group deprived access. In general, instability in channel access would result, with long channel retention periods by each re-use group.

The neighborhood capture effect will be worse if traffic loads are balanced across cells, as the synergy of cells in the same re-use group is maximum in that case. Equal traffic loading across cells is desirable for fair access in a multiple-cell WLAN, as the probability of accessing the channel successfully within a cell decreases with increasing load. In order to avoid unfairness, it is desirable to size cells (through AP power adjustment) so that the traffic loads in all cells are equal. Load balancing magnifies the negative impact of neighborhood capture, however, as the channel will be released only if there is no pending traffic in another cell of the same re-use group. A re-use group thus achieves the maximum retention probability if its combined load is equally split among its members.

Neighborhood capture has a negative impact on QoS delivery. Transmissions in cells outside the re-use group capturing the channel will be delayed excessively as transmissions will find the channel busy for long time intervals. In consequence, CFPs could not be initiated as scheduled and periodic and time-critical data will be delayed. The prioritization apparatus put in place for EDCF will also be rendered ineffective.

Figure 4:
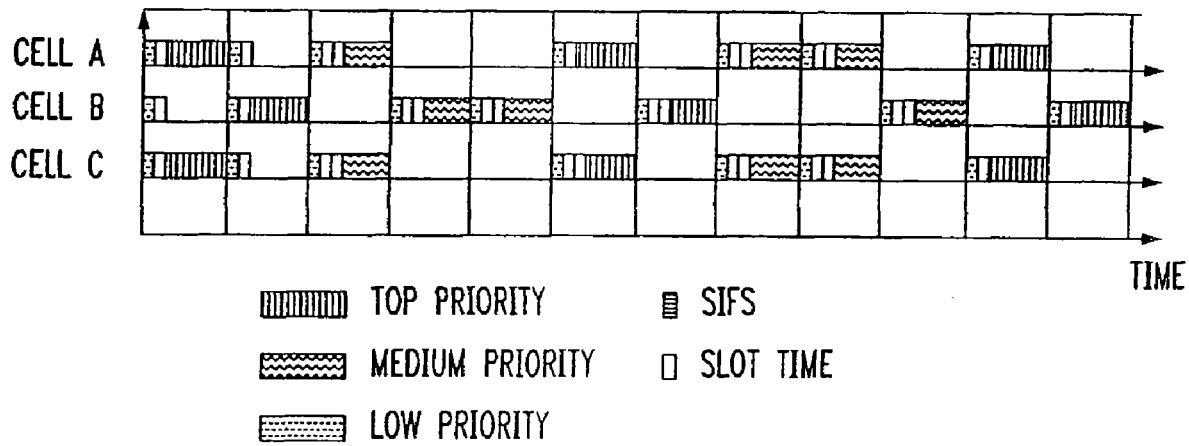
FIG. 4 shows the capture effect mitigated.

Neighborhood capture can be reduced or eliminated by requiring all stations to release the channel at prespecified times. All competing co-channel cells would thus have an equal chance to seize the channel. Global channel release (GCR) should occur at regularly spaced time intervals that are sufficiently close to meet delay and jitter restrictions for time-critical applications such as voice or video. This implies slotting of the channel into superframes and synchronization of all stations. The resulting protocol would be a Slotted CSMA/CA. FIG. 4 shows how neighborhood capture is mitigated in the three-cell co-channel scenario of FIG. 1 as a result of the global channel release requirement of the present invention.

Figure 1B:
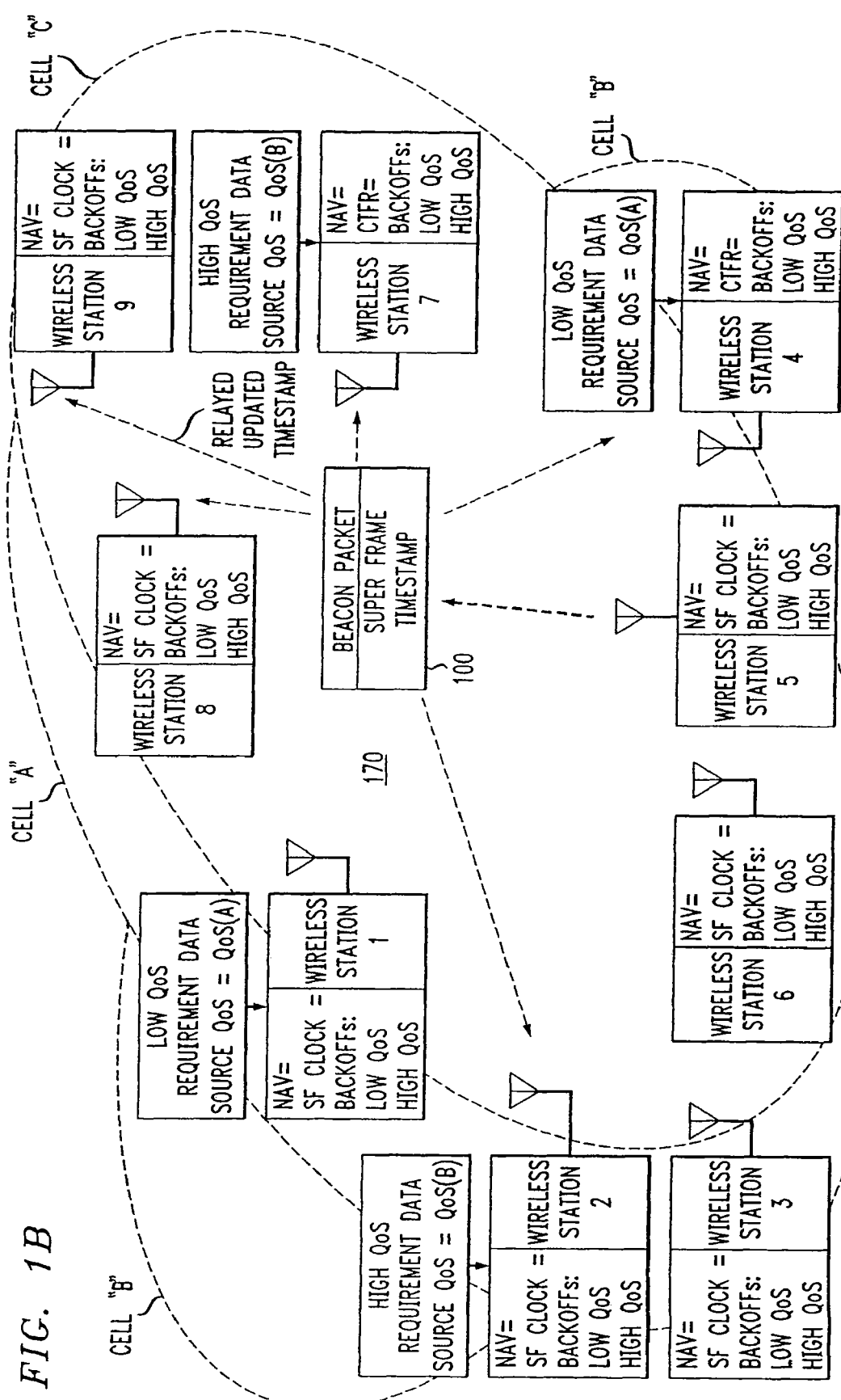
FIG. 1B shows the three-cell co-channel group of FIG. 1A, at a later target beacon transmission time (TBTT) in which Wireless station 5 transmits its beacon frame packet 100', relaying a superframe timestamp value that is updated with the passage of time since its receipt from station 3.
Figure 1:
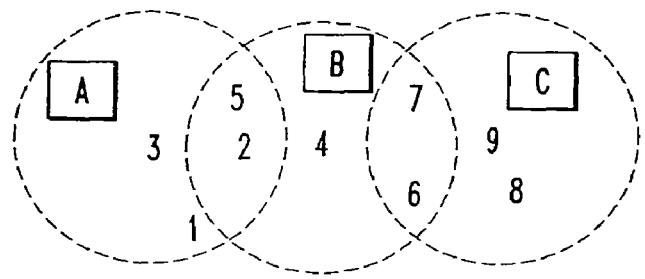
FIG. 1 shows a three-cell co-channel group.

As shown in FIG. 1A, the wireless station 3 transmits a timing packet, such as the beacon frame packet 100 or probe response frame packet of the IEEE 802.11 standard, carrying a superframe timestamp field. Each station receiving the timing packet 100 updates its SF clock if the received timestamp is later than the current value of the clock. The initial setting of the clock when a station powers on is 0. All stations in an IBSS cell prepare to transmit a beacon frame packet at a target beacon transmission time (TBTT). Each station prepares its beacon packet to contain the superframe timestamp value. Each station selects a random delay when it is to transmit its superframe timestamp value. In this manner, the superframe timestamp value is propagated to overlapped stations, such as wireless station 5 in FIG. 1A. At a later target beacon transmission time (TBTT) of FIG. 1B, wireless station 5 will relay a superframe timestamp value that is updated with the passage of time since its receipt, when it transmits its beacon frame packet 100'. In this manner, wireless stations, such as station 9, which may be out of range of wireless station 3, will receive an updated superframe timestamp value. Other timing packets that can propagate the updated superframe timestamp value include the probe response frame packet and the contention-free time response (CFTR) packet described in the above-cited U.S. Pat. No. 7,277,413, entitled "HYBRID COORDINATION FUNCTION (HCF) ACCESS THROUGH TIERED CONTENTION AND OVERLAPPED WIRELESS CELL MITIGATION," which is incorporated by reference.

The MAC protocol allocates channel time among the following: control and data frames and contention-free sessions (both CFPs and CFBs). CFSs may include all frame exchange sequences generated without contention following a successful channel contention-based access attempt, where contention is avoided through the use of SIFS spacing. A CFS may involve one or more stations and may be initiated by any station. For simplicity, the generic term busy period (BP) is used to designate any of the above.

Different MAC protocols may be used to access the channel for the different BP types. All of the MAC protocols, however, are distributed and based on carrier-sensing. BPs are all assigned an AIFS; EDCF stations are assigned AIFS values according to their priority classification; CFPs and CFBs are assigned the shortest possible AIFS value.

Figure 5:
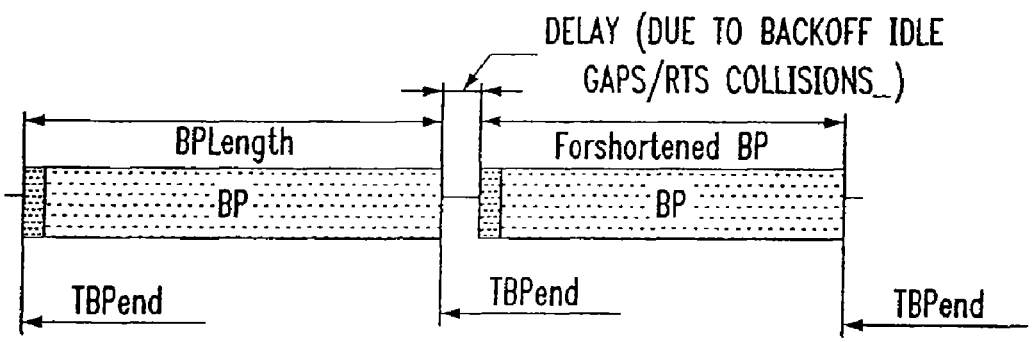
FIG. 5 depicts the global channel release of the present invention with one busy period (BP) per frame.

Capture is mitigated by requiring that the channel be free of all activity at pre-specified times—termination of the busy period (TBPend). The channel time is slotted at equal time intervals, thus creating superframes (SF) of duration SFDuration. BPs may complete before the next frame boundary. As a result, the BPs that follow must be foreshortened in order to ensure termination of the BP at the designated slotted time. This length adjustment will account also for idle time spent for AIFS and backoff delay. FIG. 5 illustrates how equal-size BPs of length BPLength are foreshortened in order to meet the global channel release requirement. Stations that attempt access unsuccessfully using a short reservation packet (RTS/CTS) may be able to use the channel within the same superframe. After first engaging in backoff, stations may transmit concurrently with successful transmissions, provided that they do not interfere. Their BPs may have to be foreshortened in order to release the channel at the next TBPend, however.

GCR does not eliminate all inequities. By forcing stations to end their BPs at the same time, equal access is offered to all stations in all cells, as there is no synergy of member cells of the same re-use group in retaining the channel. If traffic loads are equally distributed across cells and re-use groups, all stations have a fair/equal chance at the channel. But if the combined offered load is greater in one re-use group, as is possible for instance with group A-C which has more stations, the success rate of cell B would be less. GCR improves the success rate of cell B, however, relative to what the success rate would have been otherwise. To achieve greater fairness, traffic loads in all re-use groups must be comparable—hence the need to balance loads not only across cells, but also across re-use groups.

Figure 6:
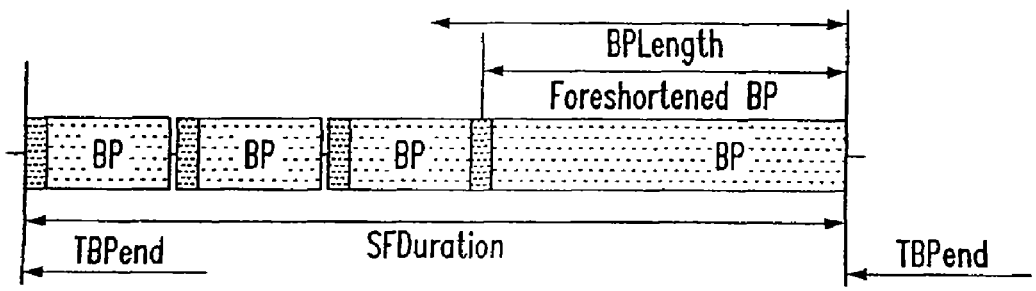
FIG. 6 illustrates the global channel release of the present invention with multiple busy periods (BPs) per superframe.

It is not necessary for GCR to occur after each data frame or CFS; it may happen less often. FIG. 6 illustrates BPs of maximum-length BPLength shorter than the superframe duration. In general, there may be multiple BPs per superframe.

In order to avoid their BPs straddling the superframe boundary, all stations in the multiple-cell WLAN must be synchronized. Synchronization may be achieved in several ways. For instance, within a cell, stations may synchronize with the AP, as is done in the current IEEE 802.11 standard. Neighboring cells may be synchronized via frames sent by stations in the overlapping coverage area of two cells. However, time offsets may arise between different cells as distant cells [cells that cannot hear each other] power on and synchronize locally, independently of one another. This would happen early in the morning when few stations are on. As more stations power on and synchronize with their neighbors in the course of the day, asynchrony may arise. Clock adjustment is necessary in order to eliminate time offsets.

Figure 7:
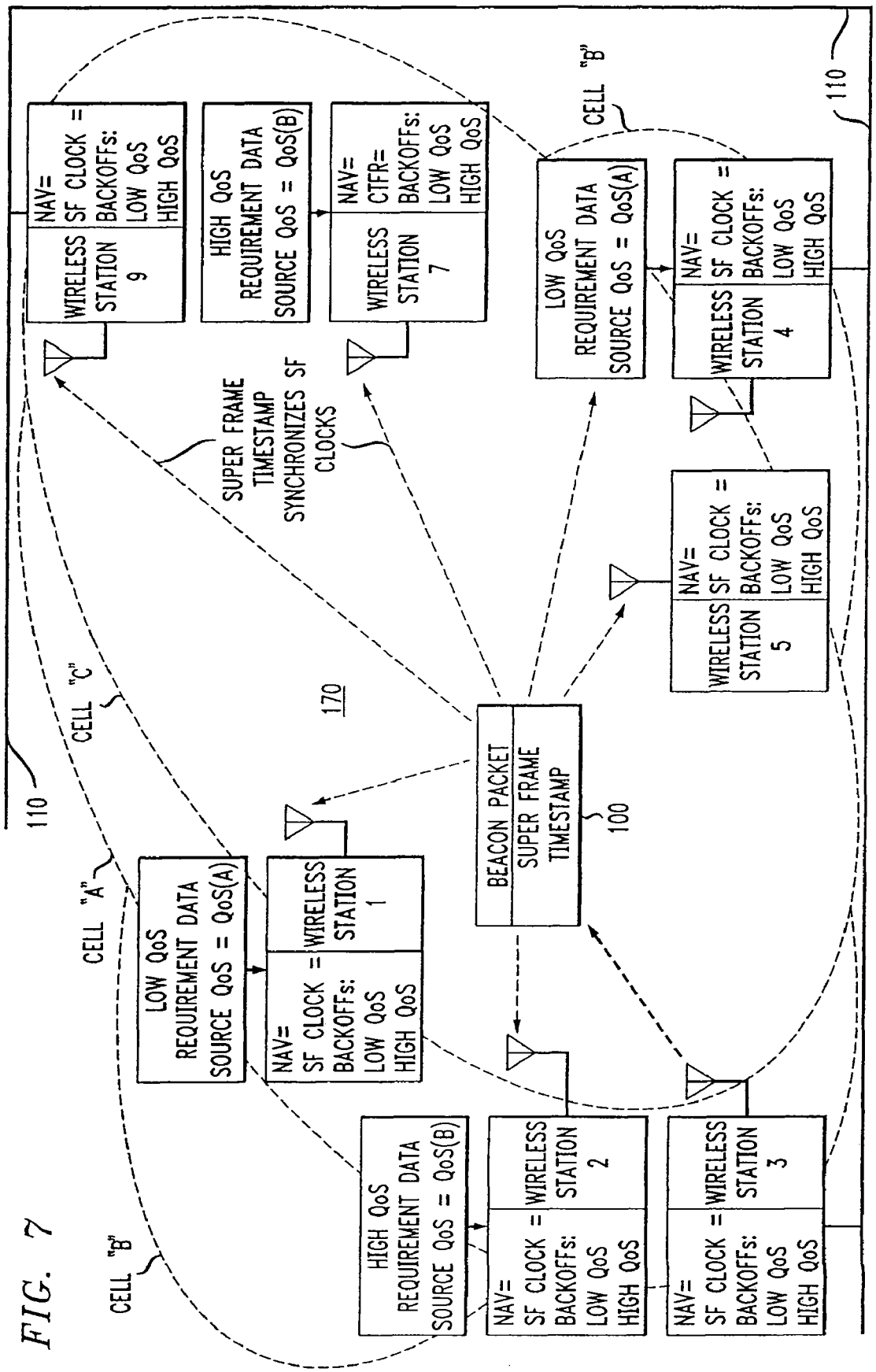
FIG. 7 depicts a three-cell co-channel group as depicted in FIG. 1 with the addition of the wired distribution network, showing the beacon packet with the superframe timestamp that synchronizes the SF clock in each station, thereby enabling global channel release (GCR) by all stations.

Time offsets between cells may be corrected in a way similar to node synchronization in an independent BSS. As shown in FIG. 7, the stations transmit a special frame, such as the beacon packet 100 or probe response frame of IEEE 802.11, carrying a superframe timestamp field. Each station updates its SF clock if the received timestamp is later. The initial setting of the clock when a station powers on is 0.

Other mechanisms are also possible for synchronization. For instance, synchronization between cells may be pursued through the wired distribution system in infrastructure WLANs.

FIG. 7 depicts a three-cell co-channel group similar to that depicted in FIG. 1 with the addition of the wired distribution network 110, which is in communication with each cell via the cell's AP. Synchronization between cells can be maintained by transmitting the superframe timestamp over the wired distribution system 110. Additionally, stations in each cell can communicate with each other and with stations in other cells via the AP, which is in communication with the wired distribution network 110. For example, if station 1 in cell A has data/communication traffic for station 7 in cell C, then when station 1 is polled by AP 3 of cell A, station 1 indicates that it has data for station 7 of cell C and the priority of the data. The AP 3 can then poll station 1 to send the data to the AP 3. If AP 3 is within wireless communication range of AP 9 in cell C, it can attempt to gain channel access to the wireless medium to communicate that data to AP 9. If channel access is granted, then AP 3 of cell A forwards station 1's data frames over the wireless medium to AP 9. Alternately, AP 3 can access the wired distribution network to forward the frames to station 9 of cell C for final distribution to station 7 of cell C. The AP can use the IEEE 802.3 protocol to access the wired distribution network 110.

The phenomenon of neighborhood capture, which arises in a multiple-cell wireless LAN with fewer channels available than the number of cells, has been described herein. Unlike in cellular communications networks where sufficient channels are available to ensure interference-free transmission on an assigned channel, channel selection in WLAN networks must be accompanied by dynamic bandwidth allocation in order to avoid interference between co-channel cells.

CSMA-type MAC protocols provide dynamic bandwidth allocation in a distributed manner, obviating the need for a central controller. With such protocols, time-overlapped transmissions by stations in non-interfering co-channel cells cooperate to capture the channel for long time periods. The result is deleterious to QoS because of the ensuing access delays in other co-channel cells.

The problem of neighborhood channel capture can be mitigated by requiring that the channel be released by all stations at prespecified times, ideally regularly spaced. All co-channel cells are thus given an equal opportunity to contend for the channel. Slotted CSMA does not eliminate all inequities, but rather simply eliminates unfairness due to the synergy of the cells in a re-use group in capturing the channel at the expense of co-channel cells outside that group. Traffic loads must be equally distributed (balanced) across both cells and re-use groups for all stations to have the same success rate in seizing the channel.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

The invention claimed is:

1. A method of distributed dynamic bandwidth allocation, comprising:
   time-slotting a communications channel into superframes of a superframe duration, wherein the superframes comprise control frames, data frames and busy periods, wherein the busy periods comprise contention-free periods and contention-free bursts;
   assigning each busy period an arbitration-time inter-frame space;
   further assigning an enhanced distributed coordination function station arbitration-time inter-frame space values according to a priority classification of the enhanced distributed coordination function station;
   further assigning contention-free periods and contention-free bursts a first arbitration-time inter-frame space value;
   further assigning available channels to a plurality of cells;
   polling stations within a cell of the plurality of cells by an access point to determine if the stations within the cell have communications traffic to transmit; and
   attempting to gain access to one of the available channels by using a reservation packet by the access point if the access point determines that the stations within the cell have communications traffic to transmit.

2. The method of claim 1, further comprising:
   performing frame exchanges if the access to the one of the available channels is gained;
   gaining the access to the one of the available channels by waiting for a backoff period and re-attempting to gain the access to the one of the available channels in the event that a transmission by another cell is less than a full time slot if the access to the one of the available channels was not gained; and performing a global channel release of all channels of the available channels at pre-specified intervals.

3. The method of claim 2, wherein the using the reservation packet is based on carrier-sensing.

4. The method of claim 2, wherein the busy periods are foreshortened to meet a global channel release requirement.

5. The method of claim 2, wherein the global channel release occurs less frequently than after each busy period if busy periods are shorter than the superframe duration.

6. The method of claim 2, further comprising:
providing a plurality of co-channel groups of cells an equal opportunity to contend for the one of the available channels.

7. The method of claim 2, wherein the global channel release is performed at regularly spaced intervals.

8. The method of claim 2, wherein communication traffic loads are balanced across the plurality of cells and a plurality of re-use groups.

9. The method of claim 2, wherein the plurality of cells in a multiple-cell wireless local area network are synchronized to avoid busy periods straddling a boundary of the superframe.

10. The method of claim 9, wherein stations within a cell of the plurality of cells are synchronized with an access point of the cell.

11. The method of claim 10, wherein synchronization between the plurality of cells is accomplished via a wired distribution system in communication with a plurality of access points of the plurality of cells.

12. The method of claim 9, wherein neighboring cells synchronize with frames sent by stations in an overlapping coverage area of the neighboring cells.

13. The method of claim 9, wherein time offsets are corrected by the stations transmitting a special frame carrying a timestamp field.

14. The method of claim 13, wherein each station updates a clock of the respective station upon a receipt of the special frame having the timestamp field.

15. A multiple-cell wireless local area network using distributed dynamic bandwidth allocation, comprising:
a wired distribution network; and
a plurality of cells, each cell having a plurality of stations, wherein one of the plurality of stations in each cell is an access point, and further wherein communications between the plurality of stations are via the access point and where the plurality of stations is within one of a same cell and a different cell, and further wherein communications between one of the plurality of stations and the wired distribution network is via the access point, and further wherein some of the plurality of stations are in different cells that overlap;
wherein the wired distribution network allocates time-slots of a communications channel into superframes of a superframe duration, wherein the superframes comprise control frames, data frames and busy periods, wherein the busy periods comprise contention-free periods and contention-free bursts;
further wherein the wired distribution network assigns each busy period an arbitration-time inter-frame space;
further wherein the wired distribution network assigns an enhanced distributed coordination function station arbitration-time inter-frame space values according to a priority classification of the enhanced distributed coordination function station;
further wherein the wired distribution network assigns contention free periods and contention free bursts a first arbitration-time inter-frame space value;
further wherein the stations within a cell are polled by the respective access point of the cell to determine if the stations within the cell have communications traffic to transmit;
further wherein the respective access point attempts to gain access to the communications channel by using a reservation packet if the respective access point determines that the stations within the cell have communications traffic to transmit.

16. The multiple-cell wireless local area network of claim 15,
further wherein when the respective access point gains the access to the communications channel, the respective access point performs frame exchanges with the wired distribution network;
further wherein when the respective access point that has communications traffic to transmit does not gain access to the communications channel, the respective access point re-attempts to gain access to the communications channel by waiting for a backoff period and attempting to gain access to the communication channel in the event that a transmission by another cell is less than a full time slot; and
further wherein each of the respective access point and the wired distribution network performs a global channel release of all channels at pre-specified intervals.

17. The multiple-cell wireless local area network of claim 16, wherein the using the reservation packet is based on carrier-sensing.

18. The multiple-cell wireless local area network of claim 16, wherein the busy periods are foreshortened to meet a global channel release requirement.

19. The multiple-cell wireless local area network of claim 16, wherein the global channel release occurs less frequently than after each busy period if busy periods are shorter than the superframe duration.

20. The multiple-cell wireless local area network of claim 16, further comprising:
providing a plurality of co-channel groups of cells an equal opportunity to contend for the communication channel.

21. The multiple-cell wireless local area network of claim 16, wherein the global channel release is performed at regularly spaced intervals.

22. The multiple-cell wireless local area network of claim 16, wherein communication traffic loads are balanced across the plurality of cells and a plurality of re-use groups.

23. The multiple-cell wireless local area network of claim 16, wherein the plurality of cells are synchronized to avoid busy periods straddling a boundary of the superframe.

24. The multiple-cell wireless local area network of claim 23, wherein stations within a cell of the plurality of cells are synchronized with the access point in the cell.

25. The multiple-cell wireless local area network of claim 23, wherein neighboring cells synchronize with frames sent by stations in an overlapping coverage area of the neighboring cells.

26. The multiple-cell wireless local area network of claim 23, wherein time offsets are corrected by the stations transmitting a special frame carrying a timestamp field.

27. The multiple-cell wireless local area network of claim 26, wherein each station updates its a clock of the respective station upon a receipt of the special frame having the timestamp field.

28. The multiple-cell wireless local area network of claim 27, wherein synchronization between the plurality of cells is accomplished via a wired distribution system in communication with the access point in each cell.

* * * * *